Nov. 2, 1926.
D. S. ROTA
1,605,782
PIPE REPAIRING OUTFIT
Filed Oct. 2, 1925
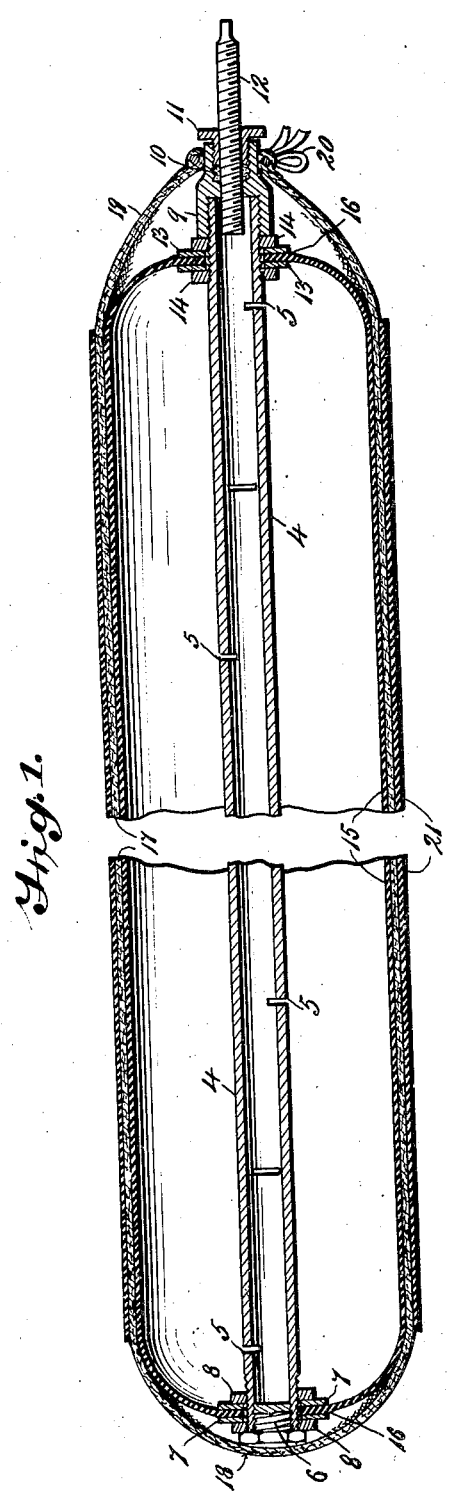
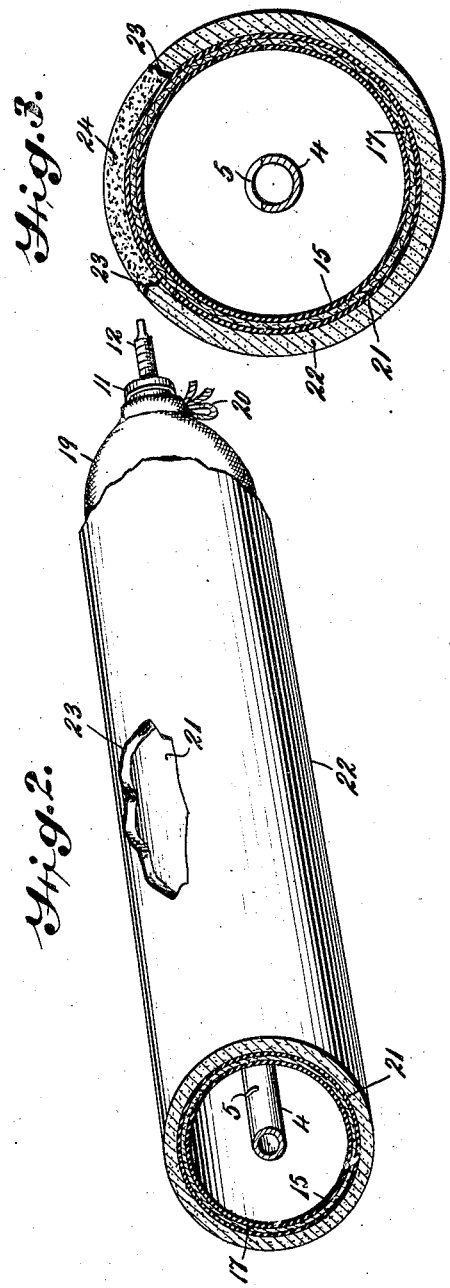
INVENTOR.
Domenico Sergio Rota
BY Alfred T. Bratton
ATTORNEY.

Patented Nov. 2, 1926.

1,605,782

UNITED STATES PATENT OFFICE.

DOMENICO SERGIO ROTA, OF PHILADELPHIA, PENNSYLVANIA.

PIPE-REPAIRING OUTFIT.

Application filed October 2, 1925. Serial No. 60,135.

This invention relates to pipe repairing outfits and more particularly to a device useful in the repair of conduits or ducts for electric light cables, telephone wires and so forth. Conduits or ducts of the type mentioned are usually made of pottery-ware or analogous moisture-proof non-conducting material and of lengths varying from one to twenty-five feet long. In use when a fracture or other damage thereto of unforeseen character obtains considerable labor and expense is involved in digging up streets or roadways to locate and repair such damage.

An object of my invention is to provide a novel means whereby pipes, conduits and the like of the character referred to can be expeditiously repaired with the minimum expenditure of time and labor.

Another object is to provide a device for the purpose specified which is simple to construct, effective in use and free of any tendency to derangement when used under long range conditions.

With the foregoing and other objects in view as will hereinafter evidence themselves, my invention consists essentially in the novel features of construction, combination and arrangement of parts later on fully explained, typically illustrated by the accompanying sheets of drawings, and the novel features whereof are tersely recited in the subjoined claim.

In the drawings:—

Figure 1 is a broken longitudinal section through a device embodying the present improvements.

Figure 2 is a part sectional isometric view illustrative of the use of my invention; and, Figure 3 is a transverse section through the device showing how a pipe fracture is neatly repaired.

According to the embodiment of my invention illustrated I take a length of three-eighth inch piping 4, of suitable length, and form a series of staggered saw-cuts 5 therein at convenient intervals. This pipe 4 is internally screw threaded at one end to receive a plug 6, and externally threaded to accommodate a pair of lock washers 7 and co-operative clamping nuts 8. The other end of the pipe 4 is fitted with a reduction nipple 9 counterbored to receive packing 10 and a screw-threaded gland 11 that similarly supports an inflating valve 12 of conventional type.

Similarly the end of the pipe 4 provided with the parts just described is externally screw threaded to receive lock washers 13 and clamping nuts 14.

15 is an inflatable elastic material tube having the ends reinforced at 16 for clamping between the lock washers 7 and 13, as will be readily understood from the drawings without further explanation. Snugly encasing the tube 15, is a stout canvas or other non-elastic casing 17 having one end 18 closed in and the other 19 provided with a draw cord 20 for securing about the reduced part of the aforesaid nipple 9 in an obvious manner. Exterior to the casing 17 is a rubber shroud or sleeve 21 for a purpose hereinafter explained.

In use, and referring more particularly to Figures 2 and 3, a fragmentary portion of an electric cable or other conduit is designated 22 and as having a broken or fractured portion 23. The fracture 23 is firstly located by means of rods—not shown—in the manner well known, and the street or roadway is opened up at the proper location to expose said fracture, whereupon the deflated device is inserted from the nearest man-hole opening and forced along the pipe 22 until it is located in position below the fracture 23. Incidentally it may be here remarked that should the fracture 23 be at a distance from the man-hole greater than the length of the pipe 4, a second or more lengths of such piping is coupled to the device by removing the valve and gland 11, in an obvious manner, and connecting non-saw-cut lengths of pipe thereto. Now it will be clearly apparent that by applying an ordinary pneumatic pump or inflator to the valve 12, and pumping in air, that the tube 15 will be expanded into engagement interior of the non-expansible casing 17 and the latter distended to its fullest diameter causing the shroud or sleeve 21 to be expanded until it conforms to the inner contour of the pipe 22. Cement or other material 24 is thereupon filled into the fracture 23 and smoothed over into alignment with the exterior surface of the pipe 22. After a few minutes for the patch to dry the device is withdrawn and it will be evident that a neat and clean repair has been effected whereupon the street or roadway is filled in again in accordance with known procedure. The shroud or sleeve 21 effectively prevents the cement 24 from adhering to the device while ensuring a smoothly finished inner surface repair to the conduit 22.

From the foregoing it is thought that the utility, time and labor saving advantages of my invention will be self evident; while it is equally apparent minor detail changes as to size and proportions therein may be readily effected without departing from the scope of said invention or sacrificing any of the advantages thereof.

Having described my invention what I claim as new and desire to secure by Letters Patent, is:—

A repair outfit for pipes comprising a non-elastic casing and an expansible shroud surrounding said casing and separate therefrom; an expansible inflatable inner tube within and independent of the casing; and means providing a valve control inlet to the inner tube.

In testimony whereof I have affixed my signature at Philadelphia, this 30th day of September, 1925.

DOMENICO S. ROTA.